(12) United States Patent
Kawai

(10) Patent No.: US 7,546,627 B2
(45) Date of Patent: Jun. 9, 2009

(54) DIGITAL BROADCAST RECEIVING AND RECORDING APPARATUS

(75) Inventor: Masanori Kawai, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 1034 days.

(21) Appl. No.: 10/625,006

(22) Filed: Jul. 23, 2003

(65) Prior Publication Data

US 2004/0120693 A1 Jun. 24, 2004

(30) Foreign Application Priority Data

Aug. 5, 2002 (JP) ............... 2002-004872 U

(51) Int. Cl.
*H04N 7/16* (2006.01)
(52) U.S. Cl. ............... 725/142; 725/46; 725/89; 386/83; 386/125; 386/126
(58) Field of Classification Search ............... 725/29, 725/56, 88, 89, 134, 142; 386/35, 46, 124, 386/83, 126; 455/151.2; 348/731, 732
See application file for complete search history.

(56) References Cited

U.S. PATENT DOCUMENTS

| | | | | |
|---|---|---|---|---|
| 5,410,326 A | * | 4/1995 | Goldstein | 455/151.2 |
| 5,592,551 A | * | 1/1997 | Lett et al. | 725/56 |
| 5,734,444 A | * | 3/1998 | Yoshinobu | 725/14 |
| 5,771,329 A | * | 6/1998 | Yun | 386/46 |
| 6,804,825 B1 | * | 10/2004 | White et al. | 725/88 |
| 6,897,904 B2 | * | 5/2005 | Potrebic et al. | 348/731 |
| 7,096,486 B1 | * | 8/2006 | Ukai et al. | 386/46 |
| 2003/0018980 A1 | * | 1/2003 | Gorbatov et al. | 386/35 |
| 2005/0152686 A1 | * | 7/2005 | Takashimizu et al. | 386/124 |

FOREIGN PATENT DOCUMENTS

| | | |
|---|---|---|
| JP | 2000-287144 | 10/2000 |
| JP | 2001-275053 | 10/2001 |
| JP | 2002-112186 | 4/2002 |

OTHER PUBLICATIONS

Patent Abstracts of Japan, Publication No. 2002-112186, Publication Date Apr. 12, 2002, 1 page.
Patent Abstracts of Japan, Publication No. 2001-275053, Publication Date Oct. 5, 2001, 1 page.
Patent Abstracts of Japan, Publication No. 2000-287144, Publication Date Oct. 13, 2000, 1 page.

* cited by examiner

*Primary Examiner*—Andrew Y Koenig
*Assistant Examiner*—Junior O Mendoza
(74) *Attorney, Agent, or Firm*—Osha • Liang LLP

(57) ABSTRACT

When an operation of starting a time shift recording is input, start a recording of a channel in viewing when the channel is set as a favorite channel. When the channel is not set as the favorite channel, recording is not started and waits for the channel to be switched again or for an input of a stop operation of the time shift recording. When a viewer performs a channel switching operation, it is checked whether or not the switched channel is set as the favorite channel. When the channel switching operation is not performed and the stopping of the time shift recording is not performed, the recording on a hard disk is subsequently made. When the stopping of the time shift recording is performed, the recording is stopped.

6 Claims, 5 Drawing Sheets

| 2:00 | | 3:00 | | 4:00 | |
|---|---|---|---|---|---|
| 102 CH | PING-PONG | XYZ | TONDERA | COMIC KING |
| 102 CH | OJA COMIC | DO RE MI | GANGA | TOUCH |

FIG. 7

| | 2:00 | | 3:00 | | 4:00 | |
|---|---|---|---|---|---|---|
| 101 CH | PICTURE | | SPECIAL PROGRAM | | NEWS | |
| 102 CH | PING-PONG | | XYZ | TONDERA | COMIC KING | |
| 103 CH | QUIZ DE DON | | | VARIETY DE DON | | |
| 104 CH | SPORT RELAY | | | | NEWS | |
| 105 CH | FISHING | | | CAMP | VISITING HOMETOWN | |
| 106 CH | OJA COMIC | | DO RE MI | | GANGA | TOUCH |

*(Prior Art)*

DIGITAL BROADCAST RECEIVING AND RECORDING APPARATUS

BACKGROUND OF THE INVENTION

1. Field of the Invention

The present invention relates to a digital broadcast receiving and recording apparatus for receiving a digital broadcast signal and generating, outputting and recording a video signal, an audio signal and program information, and particularly to a digital broadcast receiving and recording apparatus having a favorite channel function by which a viewer can configure a favorite channel.

2. Description of the Related Art

Recently, in digital broadcast, a large number of channels are provided. In digital broadcast of an ATSC (Advanced Television Standards Committee) system, broadcasts of 100 channels or more are provided. In the digital broadcast, channels covering very wide fields such as sport, news and variety programs are included and there are also channels for generally broadcasting the above wide fields or channels for specially broadcasting only one field.

A digital broadcast signal of each channel is structured by multiplexed digital data made of video data, audio data and program information data such as EPG (Electronic Program Guide) data.

When a digital broadcast receiving and recording apparatus receives the digital broadcast signal, the digital broadcast receiving and recording apparatus demodulates the digital broadcast signal into digital data and separates the digital data into video data, audio data and program information data. The video data and the audio data separated are decoded by a digital decoder and are converted into a video signal and a audio signal of an NTSC (National Television Standards Committee) system, which are an analog signal, and are outputted to an analog television receiver.

The digital broadcast receiving and recording apparatus also generates an EPG (Electronic Program Guide) image as shown in FIG. 7 based on the EPG data above acquired, and superimposes the EPG image on the video signal, and displays onto a screen of the television receiver (OSD: On Screen Display).

As shown in FIG. 7, the EPG is formatted so as to display a timetable of a plurality of channels over a predetermined time so that a viewer can easily recognize which program is broadcast in any time zone on any channel. For example, according to FIG. 7, it is easily found that "sport relay" is to be broadcast from 2:00 to 3:30 on channel 104. Each program can be selected by moving a cursor (not shown in FIG .7) displayed in the EPG. With respect to the program selected, the program contents are displayed in a separate frame and when an operation is performed to display the program, the program selected in the EPG is displayed on the screen of the television receiver. In this manner, the viewer can smoothly make a selection (channel selection) of the program. Further, when an operation is performed to select a program and then to make a recording reservation, the recording reservation of the selected program can be made smoothly.

Conventional digital broadcast receiving and recording apparatus may be equipped with a storage medium such as a hard disk drive, and there may also be equipped with a time shift recording function.

The time shift recording function is a function of storing a broadcast signal currently viewed (selected) by a viewer by digital data and sequentially reading out the stored digital data and decoding and outputting the digital data. When the viewer wants to see the program again, recorded data such as the video data and the audio data are reproduced and are outputted to the television receiver. As a result, when apart of a program is missed by the viewer due to a slight business during viewing of the program, or when a favorite scene is wanted to be seen again, the viewer can again view the program easily.

However, in the conventional digital broadcast receiving and recording apparatus, when the viewer changes a channel in the middle of the time shift recording, the recorded channel is also changed along with the change of the channel to be viewed. When an undesired channel is selected before changing to a desired channel, the undesired channel is also recorded. That is, the recording is made that an undesired program is recorded between the programs desired to view later. Therefore, the portion where the undesired program is recorded needs to be skipped at the time of reproduction.

Various kinds of the digital broadcast receiving and recording apparatuses have been conventionally provided, and there are techniques disclosed in JP-A-2000-287144, JP-A-2001-275053 and JP-A-2002-112186. However, above described problem is not solved by the technique disclosed in the above documents.

SUMMARY OF THE INVENTION

It is therefore an object of the invention to provide a digital broadcast receiving and recording apparatus in which an undesired program is not recorded even when a channel is changed during time shift recording.

In order to solve the problem described above, according to a first aspect of the invention, there is provided a digital broadcast receiving and recording apparatus including: a receiving section adapted to receive a digital broadcast signal of a selected channel;

a digital data generating section adapted to generate digital data from the digital broadcast signal; a recording section adapted to record the digital data in a predetermined format and to sequentially output the recorded digital data; a storage section adapted to store a favorite channel map indicating a favorite channel of a viewer; and a control section adapted to control the recording section to start recording the selected channel when the selected channel is included in the favorite channel map.

According to the first aspect of the invention, even when a channel is changed carelessly while time shift recording is made, only a favorite channel is recorded and recording of an undesired program is prevented.

According to a second aspect of the invention, in addition to the first aspect of the invention, the control section controls the recording section to start recording the selected channel when the selected channel is not included in the favorite channel map and is not changed over a predetermined time from a time selected.

According to the second aspect of the invention, even in the case of viewing a program which is not set to the favorite channel, when the program is continuously viewed over a predetermined time or longer, time shift recording is automatically started and the program is recorded on a storage section.

According to a third aspect of the invention, in addition to the first aspect of the invention, the control section generates an EPG image of the favorite channel based on the favorite channel map.

According to the third aspect of the invention, the EPG image is generated including only the favorite channel, so that a program willing to view and record broadcast on the favorite channel of a viewer can easily be checked and selected.

BRIEF DESCRIPTION OF THE DRAWINGS

The above objects and advantages of the present invention will become more apparent by describing preferred exemplary embodiment thereof in detail with reference to the accompanying drawings, wherein:

FIG. 7 is a diagram showing a conventional EPG.

DETAILED DESCRIPTION OF THE PREFERRED EMBODIMENTS

A digital broadcast receiving and recording apparatus according to an embodiment of the invention will be described with reference to the drawings.

Figure 1:
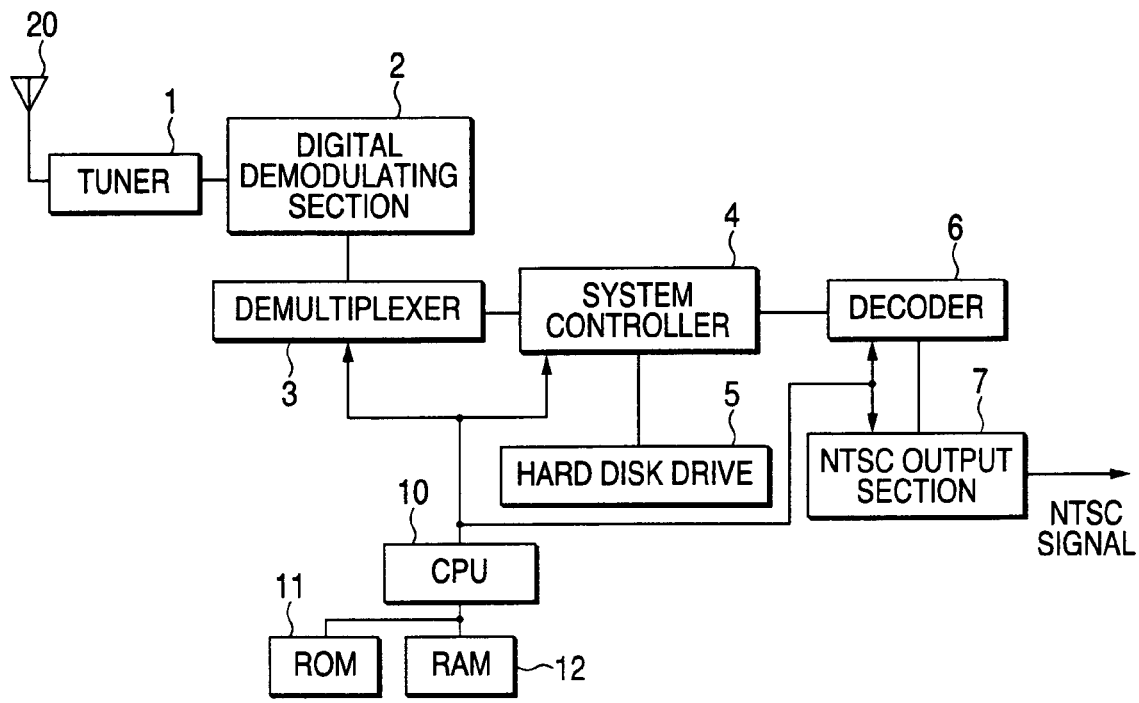
FIG. 1 is a block diagram showing an outline of a digital broadcast receiving and recording apparatus according to the invention.

FIG. 1 is a block diagram showing an outline of the digital broadcast receiving and recording apparatus.

The digital broadcast receiving and recording apparatus includes a tuner 1, a digital demodulating section 2, a demultiplexer 3, a system controller 4, a hard disk drive 5 (recording section), a decoder 6, an NTSC signal output section 7, and a CPU 10 (control section). ROM 11 and RAM 12 (storage section) are connected to the CPU 10, and programs for performing controls of the CPU 10 described below are stored in the ROM 11.

The tuner 1 is connected to an antenna 20 and extracts and amplifies a digital broadcast signal among signals received by the antenna 20. The tuner 1 outputs the amplified digital broadcast signal to the digital demodulating section 2. In the digital broadcast signal, a video signal, an audio signal and program information are superimposed for each channel. The digital demodulating section 2 converts a selected digital broadcast signal into digital data comprising video data, audio data and program information data, and outputs the data to the demultiplexer 3. The demultiplexer 3 separates the inputted digital data into video data, audio data and program information data. The video data and the audio data separated are outputted from the demultiplexer 3 and are inputted to the system controller 4. The system controller 4 records the inputted video data and the audio data on the hard disk drive 5, and the recorded video data and the audio data are sequentially read out by the system controller 4 and are outputted to the decoder 6. The decoder 6 decodes the inputted video data and the audio data, and converts the data into a video signal and an audio signal of an NTSC system, and outputs the signals to the NTSC signal output section 7. The NTSC signal output section 7 outputs the video signal and the audio signal of the NTSC system to an analog television receiver (not shown), and the television receiver displays video on a screen based on the video signal and also outputs an audio from audio output means such as a speaker based on the audio signal.

The CPU 10 generates a channel number or an EPG by an OSD image based on the program information data separated by the demultiplexer 3.

Figure 2:
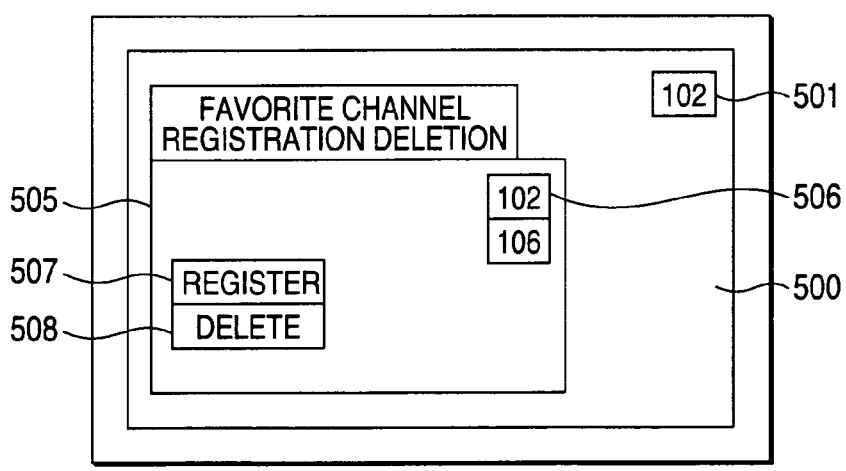
FIG. 2 is a diagram showing a state of displaying a favorite channel registration deletion image.

When there is a channel which a viewer often views, the viewer operates a remote control unit and registers with a favorite channel by a favorite channel registration deletion screen 505 including a favorite channel list 506 as shown in FIG. 2. Incidentally, FIG. 2 shows a state after registering channel "102". The favorite channel registration deletion screen 505 is superimposed on a video signal currently outputted as the OSD image by the CPU 10 and is displayed on a screen 500 of a television receiver together with a channel display window 501 for displaying a channel selected currently. On the favorite channel registration deletion screen 505, the favorite channel list 506 currently registered, a register button 507 and a delete button 508 are displayed. The viewer can register with a favorite channel by selecting the register button 507 of the favorite channel registration deletion screen 505 while viewing a channel to be registered as the favorite channel. Incidentally, a channel number to be registered as the favorite channel can also be registered using numeric buttons placed in the remote control unit. When the favorite channel is newly registered, the favorite channel is stored in the RAM 12 connected to the CPU 10. The favorite channel registration deletion screen 505 is updated and the channel added newly is displayed on the favorite channel list 506.

When a channel currently registered as the favorite channel is deleted, by selecting the delete button 508 and selecting a channel to be deleted displayed on the favorite channel list 506, the channel number is deleted from the favorite channel. An information of the newly updated favorite channel is stored in the RAM 12.

Figures 3, 4:
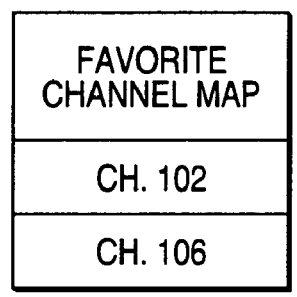
FIG. 3 is a diagram showing a favorite channel map.
FIG. 4 is a diagram showing an EPG consisting of only favorite channels.

When the favorite channel is registered, the CPU 10 generates an EPG of the favorite channel based on a favorite channel map stored in the RAM 12 as shown in FIG. 3 and EPG data included in the program information data from the demultiplexer 3. For example, in the case of setting a channel 102 and a channel 106 to the favorite channel as shown in FIG. 3, an EPG consisting of only the channels 102 and 106 as shown in FIG. 4 is generated rather than an EPG shown in FIG. 7.

According to above configuration, the viewer can see only his/her own favorite channel by the EPG, so that the viewer can easily find his/her own favorite program without seeing an undesired channel. At the time of finding the favorite program and selecting the corresponding program, the number of channels displayed is small, so that a selection can easily be made.

Hereinafter, a case where a time shift recording is configured when a viewer operates a remote control unit (not shown) will be described. When the time shift recording is configured, the CPU 10 performs control so that the video data and the audio data inputted to the system controller 4 are sequentially recorded on the hard disk drive 5 while a program is viewed. When the video data and the audio data are input, the system controller 4 records each data on the hard disk drive 5 in a file of a predetermined format. The system controller 4 sequentially reads out the video data and the audio data recorded and outputs the data to the decoder 6. When the viewer performs an operation for reproducing a program in which time shift recording is made, the system controller 4 sequentially reads out the video data and the audio data recorded on the hard disk drive 5 and outputs the data to the decoder 6. The video data and the audio data inputted to the decoder 6 are decoded and are outputted to the television receiver through the NTSC signal output section 7.

When a favorite channel is configured, the CPU 10 performs control so as to make the time shift recording only in the case that the viewer selects the favorite channel. In other words, in the case of selecting a channel that is not the favorite channel, a program of a channel in selection (viewing) is not recorded even when a state where the time shift recording is made.

One example of screen display in the above described case is shown in FIG. 5.

Figure 5A:
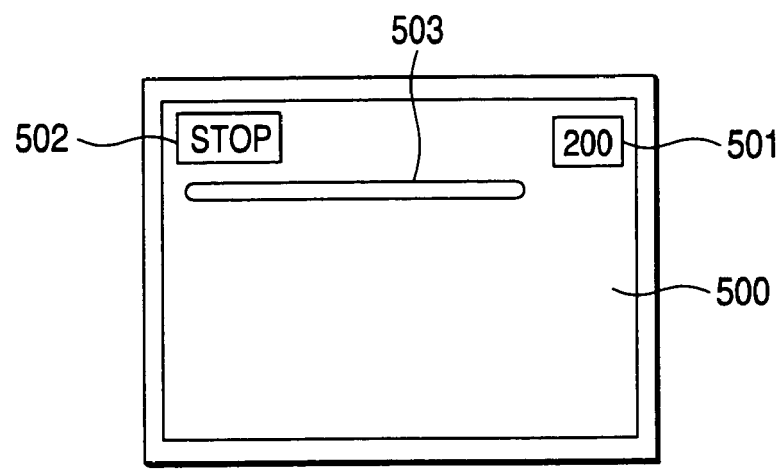
FIGS. 5A, 5B and 5C are diagrams showing a state of time shift recording.
Figure 5B:
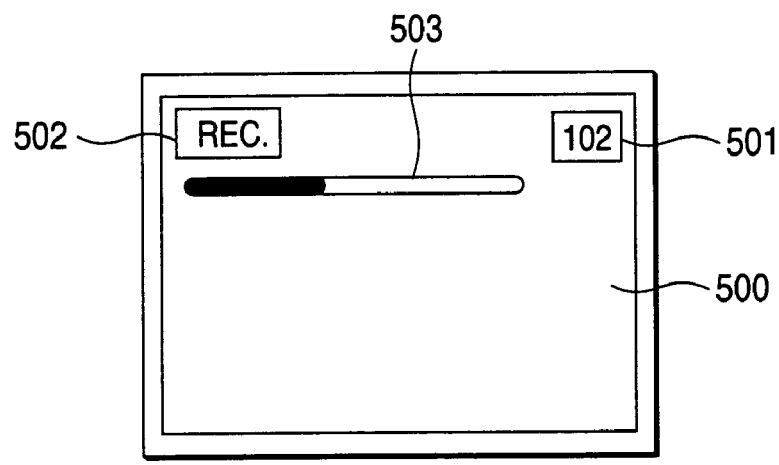
Figure 5C:
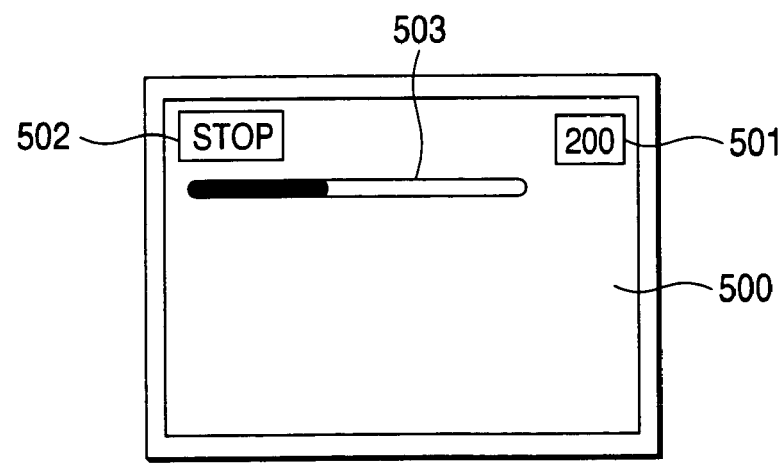

FIGS. 5A, 5B and 5C are state diagrams showing screen display of the case of making time shift recording. FIG. 5A is a screen at the time of starting the time shift recording on a channel which is not a favorite channel, FIG. 5B is a screen after switching to the favorite channel, and FIG. 5C is a screen after switching to a channel which is not the favorite channel again.

As shown in FIG. 5A, when the viewer performs an operation of time shift recording by a remote control unit during viewing on a channel which is not set to the favorite channel, the CPU 10 recognizes that a channel in viewing is absent in a favorite channel map stored in the RAM 12, and performs control so as to wait (stop) recording with respect to the system controller 4. In this state, a channel "200" currently viewed is displayed in the channel display window 501. Since the channel "200" is not set to the favorite channel, "stop" is displayed in a recording state window 502. When the viewer changes the channel to channel "102", the CPU 10 recognizes that the channel in viewing is included in the favorite channel map stored in the RAM 12, and performs control so as to start recording with respect to the system controller 4. In this state, as shown in FIG. 5B, the channel "102" currently viewed is displayed in the channel display window 501 and "REC" indicating that recording is being made is displayed in the recording state window 502. Further, elapsed time since recording was started is displayed by a length of a bar in a recording time display bar 503. When the viewer again changes the channel and selects the channel "200", the CPU 10 recognizes that the channel in viewing is not included in the favorite channel map stored in the RAM 12, and performs control so as to wait (stop) recording with respect to the system controller 4. In this state, the channel "200" is displayed in the channel display window 501 and "stop" is displayed in the recording state window 502. A total recording time at the time is displayed by a length of the bar in the recording time display bar 503. Thereafter, when the viewer further changes the channel to the favorite channel, the time shift recording is again started.

Figure 6:
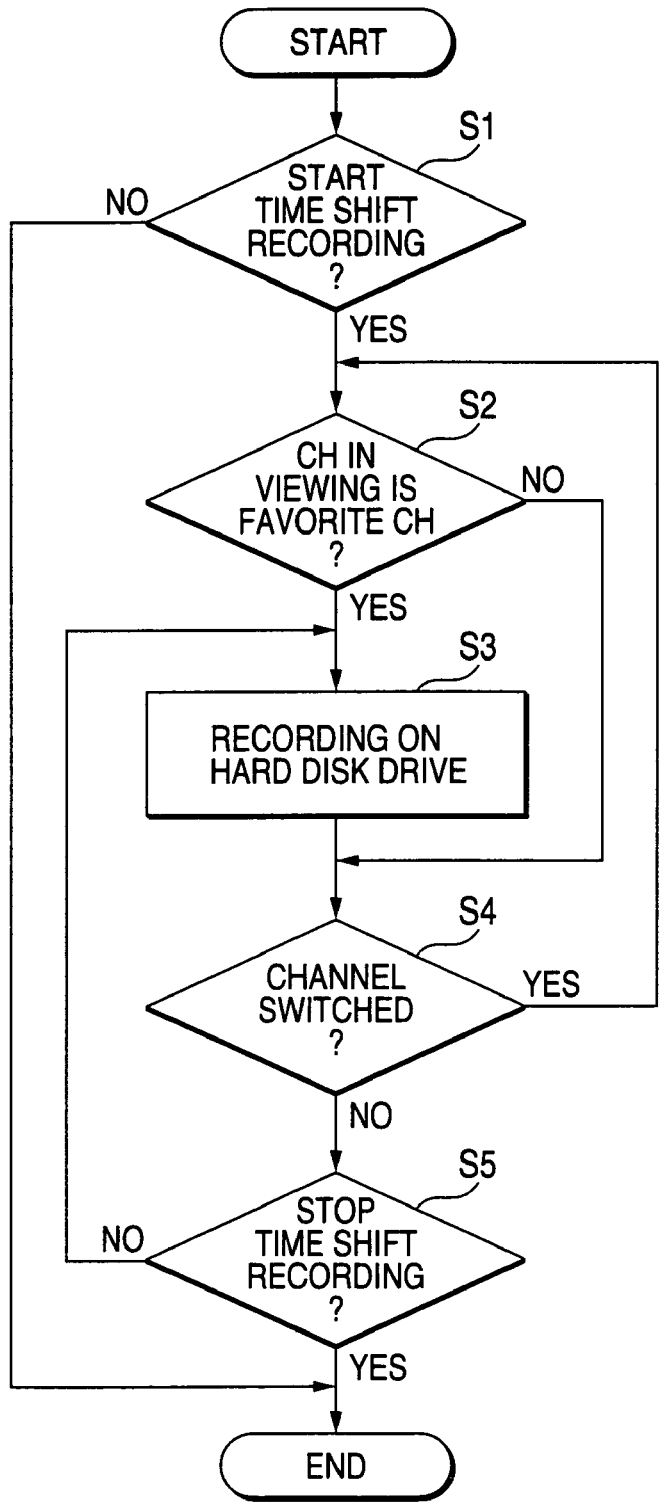
FIG. 6 is a flowchart showing a flow of the time shift recording.

A flowchart showing a series of flow of the time shift recording is shown in FIG. 6 and description will be made hereinbelow.

An operation of starting the time shift recording is received from the viewer by the remote control unit (step S1). The CPU 10 checks whether or not the channel in viewing at the time is set to the favorite channel stored in the RAM 12 (step S2) and when the channel in viewing is set to the favorite channel, the system controller 4 makes recording on the hard disk drive 5 (step S3). When the channel in viewing is not the favorite channel, recording is not made and waits to perform channel switching or stopping the time shift recording operation. When the viewer performs the channel switching operation, the CPU 10 checks whether or not the channel switched is set to the favorite channel (step S4 to step S2). When the channel switching operation is not performed and the stopping of the time shift recording operation is not performed, the recording on the hard disk drive 5 is subsequently made (step S4, step S5 to step S3). When the stopping of the time shift recording operation is performed, the recording is stopped (step S5).

According to the above operation, even when the viewer temporarily switches a channel to a program undesired to record while the time shift recording is made, the program is not recorded and the time shift recording of only a program desired to be record can be made. Also, it is unnecessary to stop and resume the recording every time the channel is changed, so that only a program desired to be recorded can easily be recorded. Further, in this manner, only the desired program can be recorded, so that capacity of the hard disk drive 5 can be used effectively.

Incidentally, in the embodiment, an example in which the time shift recording cannot be made unless the channel is set to the favorite channel has been shown. However, there are cases that the time shift recording is desired to be made for a channel that is not set as the favorite channel, for example, the case that a special program desired to see is broadcast on a channel which is not set as the favorite channel.

Therefore, it is also possible to be configured so as to start the time shift recording when viewing is continued over a predetermined time even in the case of selecting the channel that is not set as the favorite channel.

According to the above configuration, a program willing to make the time shift recording broadcast on the channel that is not set as the favorite channel can be recorded as necessary.

According to the embodiment, the time shift recording can be made only at the time of viewing a channel set as the favorite channel, so that even when a viewer temporarily switches the channel to a program unwilling to record while the time shift recording is made, the switched program is not recorded and the time shift recording of only the program desired to be recorded can be made. It is unnecessary to stop and resume the recording every time the channel is changed, so that only the program desired to be recorded can easily be recorded.

It is also possible to be configured so as to start the time shift recording by continuously viewing a program of a channel which is not set as the favorite channel over a predetermined time while the time shift recording is made. As a result, the time shift recording of the program of the channel that is not set as the favorite channel can also be made as necessary.

In the embodiment, the EPG only for the favorite channel can be generated, so that a program and a channel capable of immediately starting time shift recording can easily be checked. The viewer can see only his/her own favorite channel by an EPG screen. Therefore, the viewer can easily find his/her own favorite program without seeing an undesired channel. Further, at the time of finding the favorite program and selecting the corresponding program, the number of channels displayed is small, so that a selection can easily be made.

Although the present invention has been shown and described with reference to specific preferred embodiments, various changes and modifications will be apparent to those skilled in the art from the teachings herein. Such changes and modifications as are obvious are deemed to come within the spirit, scope and contemplation of the invention as defined in the appended claims.

What is claimed is:

1. A digital broadcast receiving and recording apparatus comprising:
    a receiving section adapted to receive a digital broadcast signal of a channel selected by a viewer;
    a digital data generating section adapted to generate digital data from the digital broadcast signal;
    a recording section adapted to record the digital data in a predetermined format and to sequentially output the recorded digital data;

a storage section adapted to store a favorite channel map indicating a favorite channel of the viewer; and a control section adapted to control the recording section to start and stop recording the selected channel and to generate an EPG image of the favorite channel based on the favorite channel map, wherein when the viewer selects one channel which is included in the favorite channel map as the selected channel, the control section controls the recording section to start recording the selected channel;

wherein when the viewer changes the selected channel to another channel which is not included in the favorite channel map while the recorder section records the one channel, the control section controls the recording section to stop recording the selected another channel; and wherein when the another channel is not changed over a predetermined time while the recording section does not record the selected channel, the control section controls the recording section to restart recording the selected channel.

2. A digital broadcast receiving and recording apparatus comprising:

a receiving section adapted to receive a digital broadcast signal of a channel selected by a viewer;

a digital data generating section adapted to generate digital data from the digital broadcast signal;

a recording section adapted to record the digital data in a predetermined format and to sequentially output the recorded digital data;

a storage section adapted to store a favorite channel map indicating a favorite channel of the viewer; and a control section adapted to control the recording section to start and stop recording the selected channel, wherein when the viewer selects one channel which is included in the favorite channel map as the selected channel, the control section controls the recording section to start recording the selected channel;

wherein when the viewer changes the selected channel to another channel which is not included in the favorite channel map, while the recording section records the one channel, the control section controls the recording section to stop recording the selected another channel.

3. The digital broadcast receiving and recording apparatus as claimed in claim 2, wherein the control section controls the recording section to start recording the selected channel when the another channel is not changed over a predetermined time while the recording section does not record the selected channel.

4. The digital broadcast receiving and recording apparatus as claimed in claim 2, wherein the control section is adapted to generate an EPG image of the favorite channel based on the favorite channel map.

5. The digital broadcast receiving and recording apparatus as claimed in claim 2, further comprising an output section adapted to convert the digital data into analog data and to output the analog data.

6. A digital broadcast receiving and recording apparatus comprising:

a receiving section adapted to receive a digital broadcast signal of a channel selected by a viewer;

a digital data generating section adapted to generate digital data from the digital broadcast signal;

a recording section adapted to perform a time shift recording in which the digital data generated from the digital broadcast signal of the channel currently selected by the viewer is recorded in a predetermined format and to sequentially output the recorded digital data;

a storage section adapted to store a favorite channel map indicating a favorite channel of the viewer; and a control section adapted to control the receiving section, the digital data generating section, the recording section and the storage section, wherein when the viewer issues an instruction to perform the time shift recording, the control section determines whether the channel currently selected by the viewer is included in the favorite channel map;

wherein the recording section records the digital data of the channel currently selected and sequentially outputs the recorded digital data when the selected channel is included in the favorite channel map;

wherein the recording section stops recording the digital data of the channel currently selected when the selected channel is not included in the favorite channel map;

wherein when the viewer issues an instruction to change the channel during the time shift recording, the control section determines whether the channel currently changed by the viewer is included in the favorite channel map;

wherein the recording section records the digital data of the channel currently changed and sequentially output the recorded digital data when the changed channel is included in the favorite channel map; and wherein the recording section stops recording the digital data of the channel currently changed when the changed channel is not included in the favorite channel map.

* * * * *